(12) United States Patent
Chang

(10) Patent No.: US 7,554,644 B2
(45) Date of Patent: Jun. 30, 2009

(54) LCD PANEL HAVING CAPACITOR DISPOSED OVER OR BELOW PHOTO SPACER WITH ACTIVE DEVICE ALSO DISPOSED BETWEEN THE PHOTO SPACER AND A SUBSTRATE, ALL DISPOSED OVER OPAQUE REGION OF DISPLAY

(75) Inventor: Wei-Chih Chang, Jhudong Township (TW)

(73) Assignee: TPO Displays Corp., Chu-Nan (TW)

( * ) Notice: Subject to any disclaimer, the term of this patent is extended or adjusted under 35 U.S.C. 154(b) by 461 days.

(21) Appl. No.: 11/341,922

(22) Filed: Jan. 27, 2006

(65) Prior Publication Data
US 2007/0177072 A1 Aug. 2, 2007

(51) Int. Cl.
*G02F 1/1339* (2006.01)
(52) U.S. Cl. ......................... 349/155; 349/38
(58) Field of Classification Search ................ 349/38, 349/39, 155, 156
See application file for complete search history.

(56) References Cited

U.S. PATENT DOCUMENTS

| 5,748,266 | A | * | 5/1998 | Kodate ................ 349/39 |
| 6,724,447 | B2 | * | 4/2004 | Kim ................... 349/106 |
| 6,738,204 | B1 | | 5/2004 | Chuang et al. |
| 6,791,631 | B2 | | 9/2004 | Cheng et al. |
| 6,816,210 | B2 | | 11/2004 | Chen |
| 6,930,372 | B2 | | 8/2005 | Chiu et al. |
| 7,113,234 | B2 | * | 9/2006 | Chang ................ 349/38 |
| 2004/0233175 | A1 | | 11/2004 | Chuang |
| 2005/0140642 | A1 | | 6/2005 | Chiu et al. |
| 2005/0157245 | A1 | * | 7/2005 | Lin et al. .............. 349/155 |
| 2005/0213002 | A1 | | 9/2005 | Wen et al. |
| 2005/0231451 | A1 | | 10/2005 | Chu et al. |

FOREIGN PATENT DOCUMENTS

| CN | 1602125 | 3/2005 |
| CN | 1704811 | 12/2005 |

\* cited by examiner

*Primary Examiner*—David Nelms
*Assistant Examiner*—John Heyman
(74) *Attorney, Agent, or Firm*—Liu & Liu

(57) ABSTRACT

A liquid crystal display panel comprising a first substrate, a second substrate, a plurality of photo spacers and a plurality of capacitors are provided. The first substrate has a transparent region and an opaque region. The second substrate is disposed over the first substrate. The photo spacers are disposed between the first substrate and the second substrate and located on the opaque region. The capacitors are disposed between the first substrate and the photo spacers or disposed between the second substrate and the photo spacers. The liquid crystal layer is disposed between the first substrate and the second substrate.

20 Claims, 8 Drawing Sheets

# LCD PANEL HAVING CAPACITOR DISPOSED OVER OR BELOW PHOTO SPACER WITH ACTIVE DEVICE ALSO DISPOSED BETWEEN THE PHOTO SPACER AND A SUBSTRATE, ALL DISPOSED OVER OPAQUE REGION OF DISPLAY

BACKGROUND OF THE INVENTION

1. Field of the Invention

The present invention generally relates to an electronic apparatus. More particularly, the present invention relates to an electronic apparatus comprising a liquid crystal display panel with high aperture ratio.

2. Description of Related Art

Flat panel display device has its several advantages to the conventional cathode ray tube (CRT) display device, and now is a common tool being used for display any information. The image of the flat panel display device is composed by a pixel array. Each pixel of the image can be controlled so as to display the desired color. The image is then composed of for example, a few hundred thousand pixels or even a few million pixels or more. In the various types of flat panel display device, the liquid crystal display (LCD) is one of the common flat panel display devices in the market.

The conventional LCD panel has a basic structure as shown in FIG. 1. In FIG. 1, the conventional LCD panel 100 includes a thin film transistor array substrate 110, a color filter array substrate 120 and a liquid crystal layer 130. The liquid crystal layer 130 is disposed between the thin film transistor array substrate 110 and the color filter array substrate 120. The thin film transistor array substrate 110 includes a glass substrate 112 and a plurality of thin film transistors 114 (only one shown in FIG. 1) thereon. Each of the thin film transistors 114 drove by a scan line and a data line (not shown in FIG. 1) electrically connects to a pixel electrode 116. Otherwise, the color filter array substrate 120 includes a glass substrate 122 and a common electrode layer 124 thereon. The liquid crystal layer 130 is control by the electromagnetic field applied from the pixel electrode 116 and the common electrode layer 124, so that the light transmittance can be control by the liquid crystal layer 130 for image display.

In order to maintain the electromagnetic field for driving the liquid crystal layer 130 while the thin film transistors 114 are off, a plurality of storage capacitances are necessary. In the LCD panel 100, a plurality of common lines 118 (only one shown in FIG. 1) are disposed on the glass substrate 112. Consequently, a storage capacitance 140 is formed between the common line 118 and the pixel electrode 116. However, the common lines 118 are made of metal, so that the light can not transmit the common lines 118, and the aperture ratio of the LCD panel 100 is decreased by the common lines 118.

SUMMARY OF THE INVENTION

The present invention provides a matrix substrate with high aperture ratio.

The present invention provides a LCD panel with high aperture ratio.

The present invention provides an electronic apparatus comprising an LCD panel with high aperture ratio.

As embodied and broadly described herein, the present invention provides a matrix substrate comprising a substrate, a plurality of photo spacers and a plurality of capacitors. The substrate has a transparent region and an opaque region. The photo spacers are disposed over the opaque region of the substrate. The capacitors are disposed over the photo spacers.

As embodied and broadly described herein, the present invention provides a liquid crystal display panel comprising a first substrate, a second substrate, a plurality of photo spacers and a plurality of capacitors is provided. The first substrate has a transparent region and an opaque region. The second substrate is disposed over the first substrate. The photo spacers are disposed between the first substrate and the second substrate and located on the opaque region. The capacitors are disposed between the first substrate and the photo spacers or disposed between the second substrate and the photo spacers. The liquid crystal layer is disposed between the first substrate and the second substrate.

As embodied and broadly described herein, the present invention provides an electronic apparatus including the mentioned liquid crystal display panel, a user interface and a circuit unit. The circuit unit is coupled to the liquid crystal display module and the user interface.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
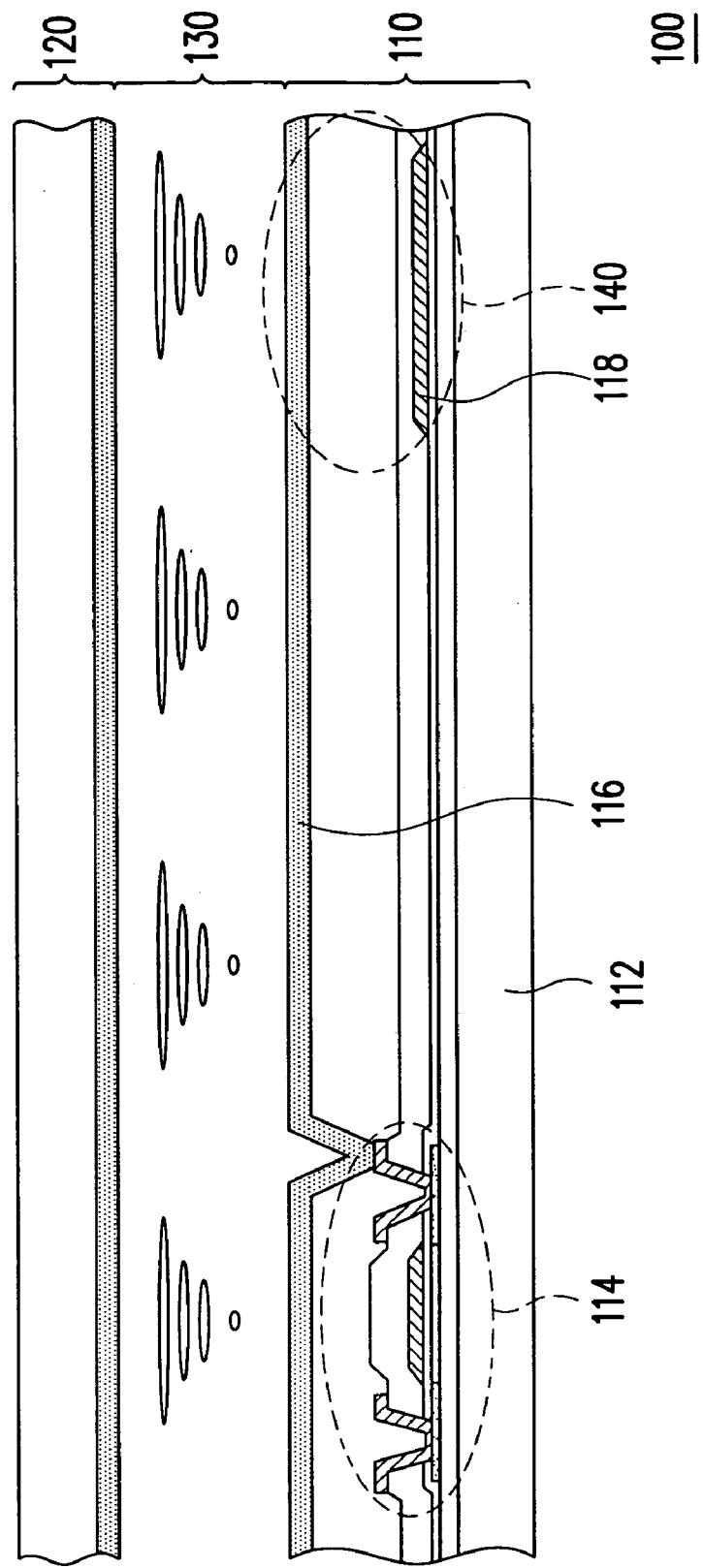
FIG. 1 is a cross-sectional view, schematically illustrating a conventional LCD.

The present invention provides a matrix substrate comprising a substrate, a plurality of photo spacers and a plurality of capacitors. Wherein, the substrate has a transparent region and an opaque region, and the photo spacers are disposed over the opaque region of the substrate. The capacitors are disposed over the photo spacers. In one embodiment, the matrix substrate could be an active device array substrate. In another embodiment, the matrix substrate could be a color filter array substrate. Naturally, the matrix substrate provided in the invention also can be other matrix substrates that conform to the foregoing description, but only the embodiments of the active device array substrate and the color filter array substrate will be introduced here.

Reference will now be made in detail to the present embodiments of the invention, examples of which are illustrated in the accompanying drawings. Wherever possible, the same reference numbers are used in the drawings and the description to refer to the same or like parts.

Figure 2A:
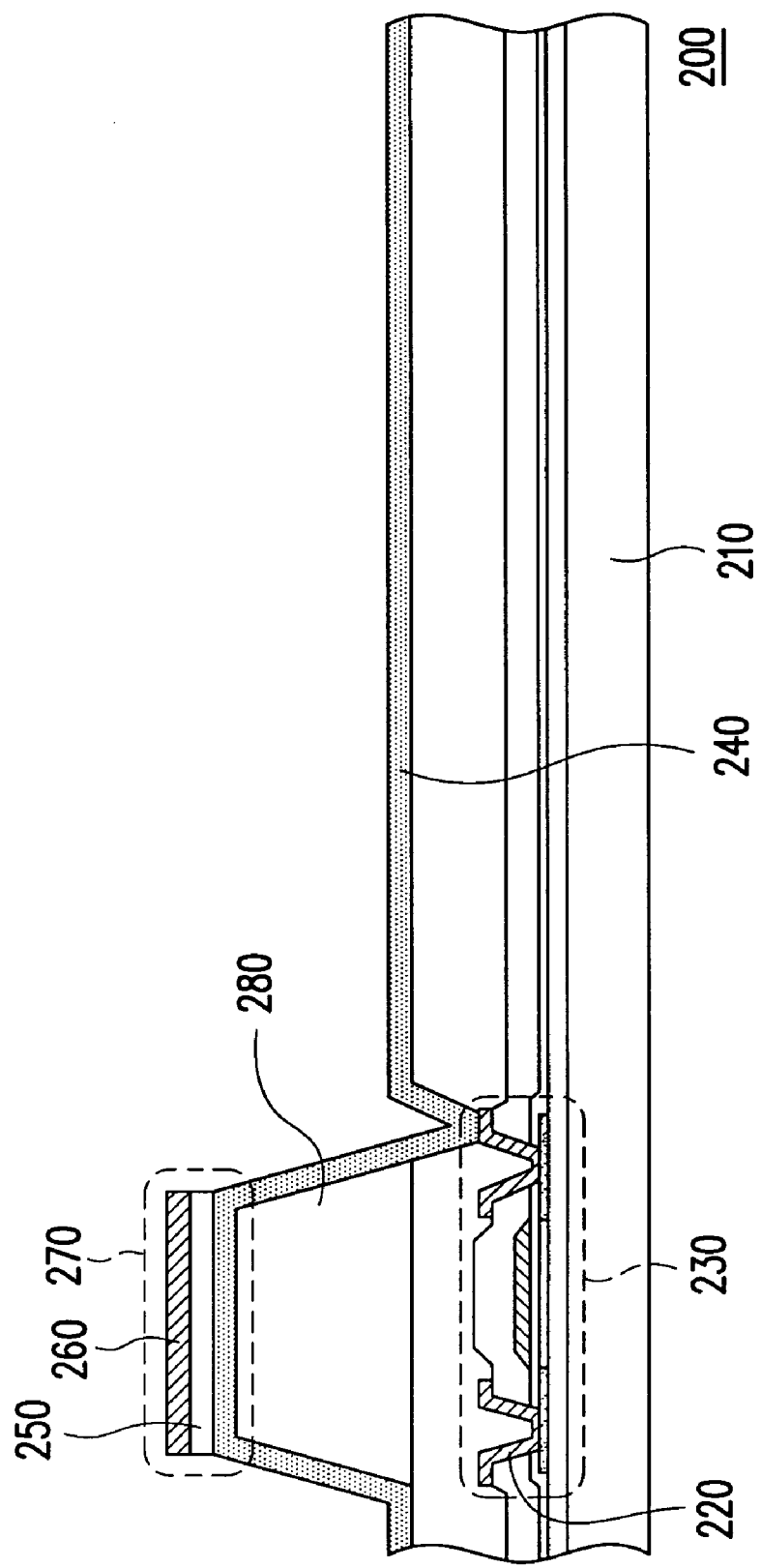
FIGS. 2A and 2B are cross-sectional view and top view, schematically illustrating an embodiment of the matrix substrate according to the present invention.
Figure 2B:
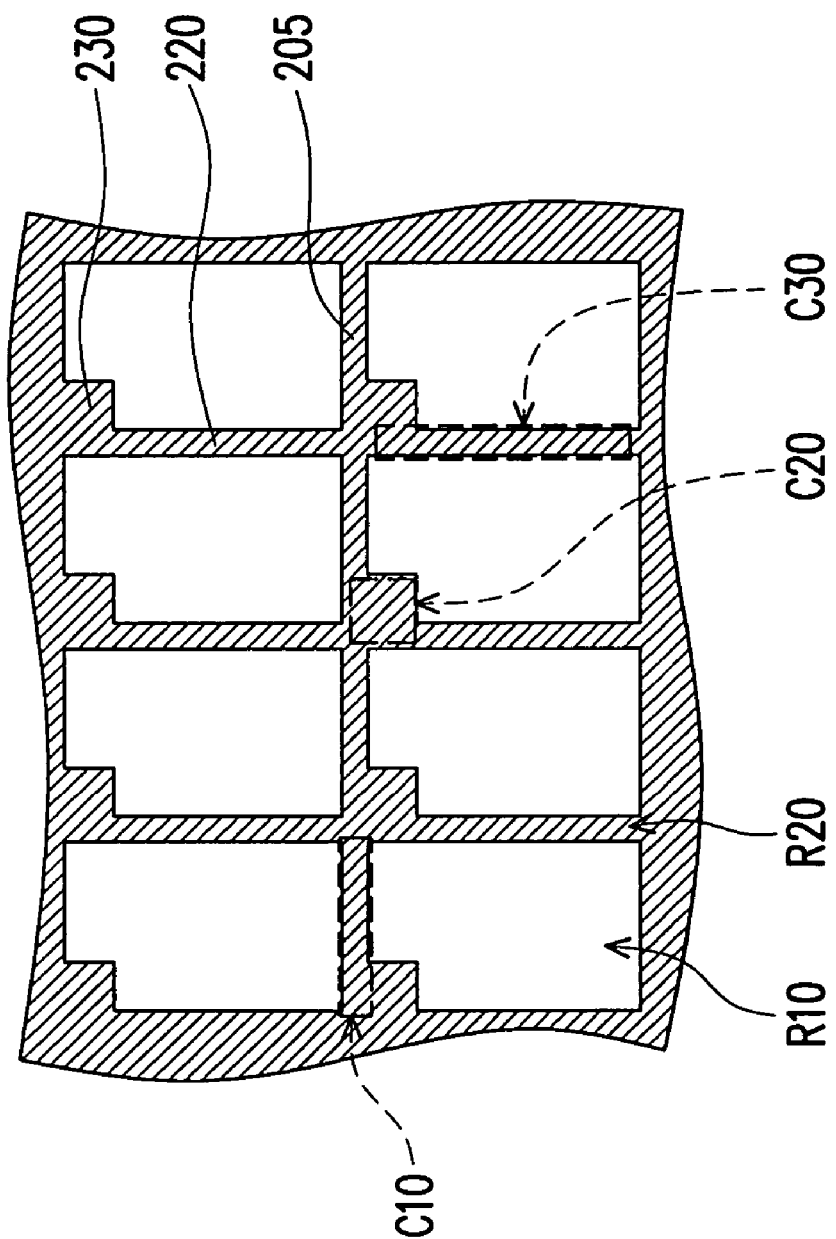

FIGS. 2A and 2B are cross-sectional view and top view, schematically illustrating an embodiment of the matrix substrate according to the present invention. In this embodiment, the matrix substrate is an active device array substrate. As shown in FIGS. 2A and 2B, the active device array substrate 200 includes a substrate 210, a plurality of scan lines (only shown in FIG. 2B), a plurality of data lines 220, a plurality of active devices 230, a plurality of pixel electrodes 240, a dielectric layer 250, a plurality of conductive films 260 and a plurality of photo spacers 280. There are only one data line 220, one active device 230, one pixel electrode 240 and one conductive film 260 shown in FIG. 2A. The substrate 210 has a transparent region R10 and an opaque region R20 and could be a glass substrate or a substrate made of other appropriate material. The scan lines 205, the data lines 220 and the active devices 230 are disposed over the opaque region R20 of the substrate 210. The pixel electrodes 240 are disposed over the substrate 210. The active devices 230 are electrically connected to and driven by the scan lines and the data lines 220. The pixel electrodes 240 are electrically connected to the active devices 230. The active devices 230 are used as the switch for controlling the signal writing to the pixel electrodes 240. Wherein, the active devices 230 could be the thin film transistors or others, and the material of the pixel electrodes 240 could be indium tin oxide (ITO), indium zinc oxide (IZO) or others.

The photo spacers 280 are provided over the opaque region R20 of the substrate 210 and under the pixel electrodes 240, the dielectric layer 250 and the conductive films 260. The photo spacers 280 are used to keep a gap between the active device array substrate 200 and the opposite substrate (not shown) in an LCD, so that the conductive films 260 over the photo spacers 280 could be electrically connected to a common electrode layer (not shown) of the opposite substrate after the active device array substrate 200 is attached to the opposite substrate.

Moreover, the dielectric layer 250 is disposed on the pixel electrodes 240 and over the photo spacers 280, and the conductive films 260 are disposed on the dielectric layer 250 and located above the scan lines (such as the area C10 in FIG. 2B), the data lines 220 (such as the area C30 in FIG. 2B) or the active devices 230 (such as the area C20 in FIG. 2B). While the electric potential difference exists between the conductive films 260 and the pixel electrodes 240, a plurality of storage capacitances 270 could be formed between the conductive films 260 and the pixel electrodes 240. Because the storage capacitances 270 are formed above the opaque region R20 of the substrate 210, such as the region above the scan lines, the data lines 220 and the active devices 230, the aperture ratio will not be decreased, so that the active device array substrate 200 has the aperture ratio higher than that of the prior art. Wherein, the conductive films 260 could be electrically connected to a common electrode layer (not shown) of an opposite substrate in an LCD. However, the conductive films 260 could be electrically connected to other voltage provider. Furthermore, the material of the conductive films 260 could be metal or others. The storage capacitances 270 with metallic conductive films 260 have great performance.

Figure 3A:
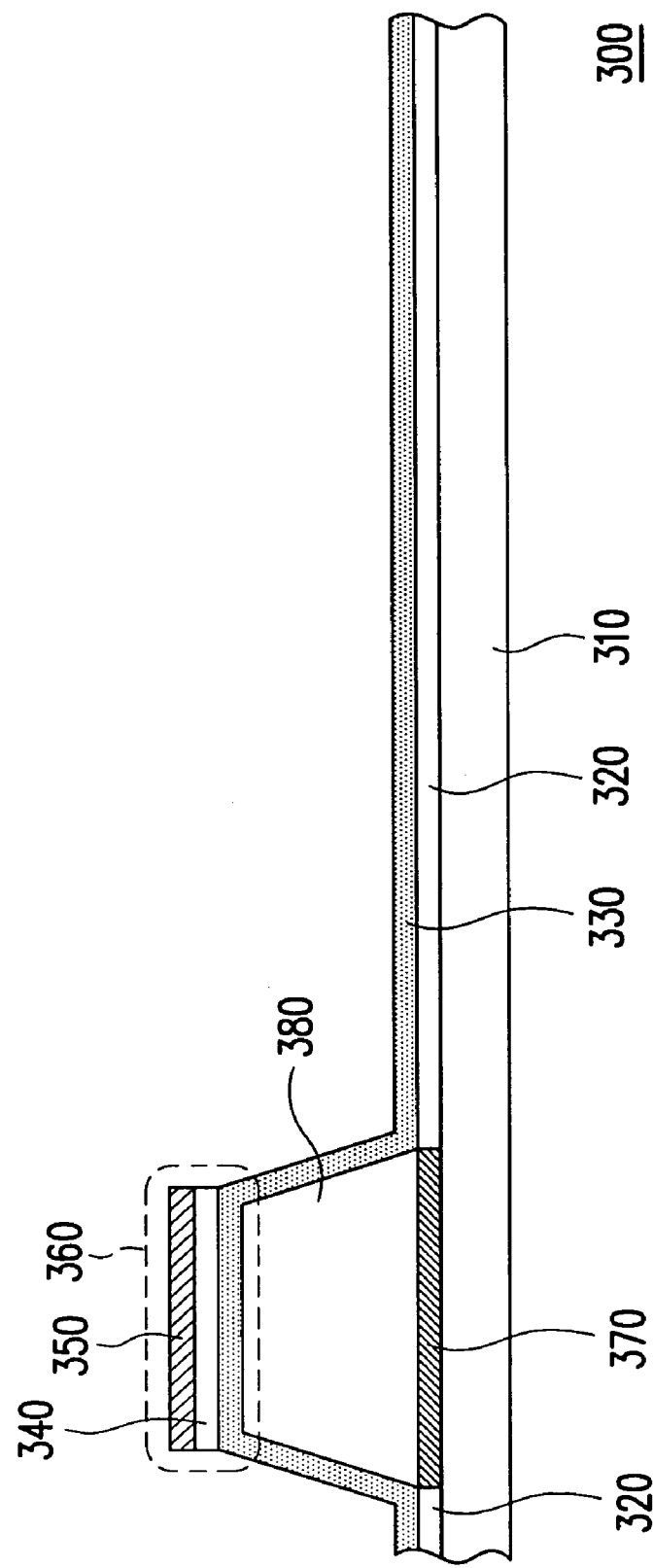
FIGS. 3A and 3B are cross-sectional view and top view, schematically illustrating another embodiment of the matrix substrate according to the present invention.
Figure 3B:
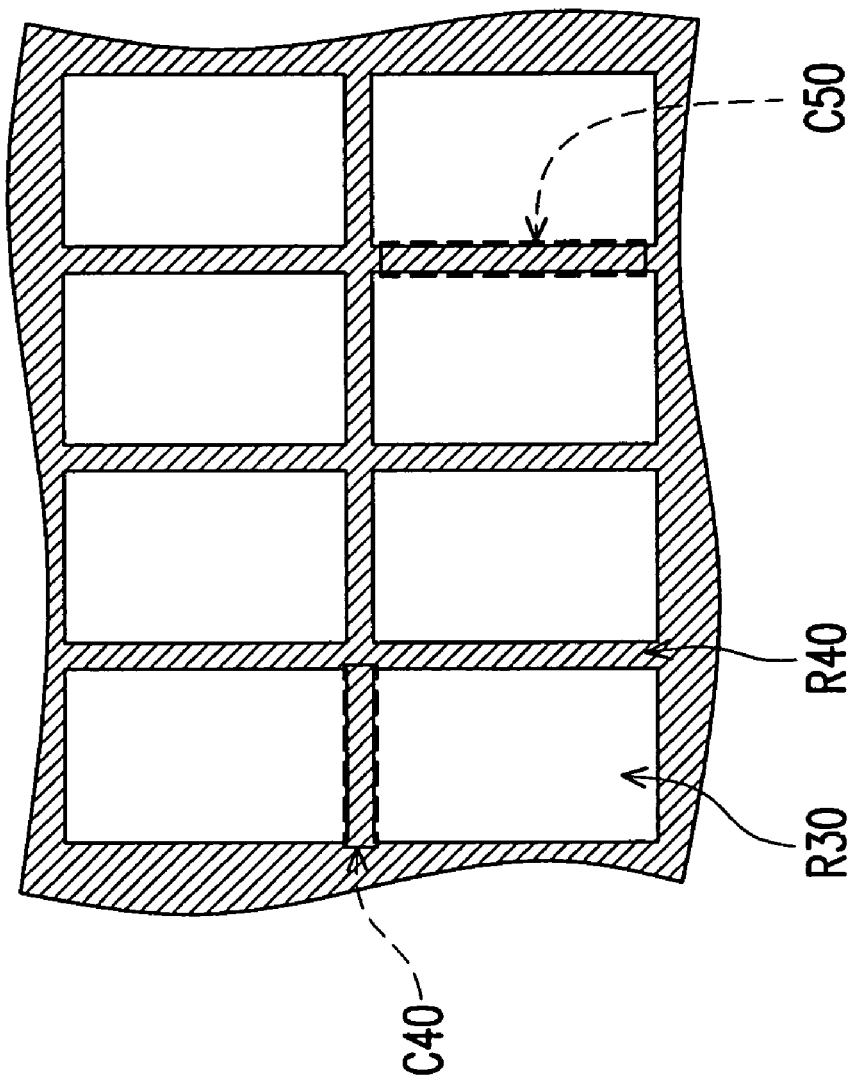

FIGS. 3A and 3B are cross-sectional view and top view, schematically illustrating another embodiment of the matrix substrate according to the present invention. In this embodiment, the matrix substrate is a color filter array substrate. As shown in FIGS. 3A and 3B, the color filter array substrate 300 includes a substrate 310, a plurality of color filters 320, a common electrode layer 330, a dielectric layer 340, a plurality of conductive films 350 and a plurality of photo spacers 380. There are only two color filters 320 and one conductive film 350 shown in FIG. 3A. The substrate 310 has a transparent region R30 and an opaque region R40 and could be a glass substrate or a substrate made of other appropriate material. The color filters 320 and the common electrode layer 330 are disposed over the substrate 310, and the common electrode layer 330 covers the color filters 320. The material of the common electrode layer 330 could be indium tin oxide (ITO), indium zinc oxide (IZO) or others.

The dielectric layer 340 is disposed on the common electrode layer 330 in the opaque region R40 of the substrate 310, and the conductive films 350 are disposed on the dielectric layer 340. While the electric potential difference exists between the conductive films 350 and the common electrode layer 330, a plurality of storage capacitances 360 could be formed between the conductive films 350 and the common electrode layer 330 and located over the opaque region R40 of the substrate 310, such as the areas C40 and C50 in FIG. 3B. The photo spacers 380 are provided over the opaque region R40 of the substrate 310 and under the common electrode layer 330, the dielectric layer 340 and the conductive films 350. The photo spacers 280 are used to keep a gap between the color filter array substrate 300 and the opposite substrate (not shown) in an LCD, so that the conductive films 350 over the photo spacers 380 could be electrically connected to a pixel electrodes (not shown) of the opposite substrate after the color filter array substrate 300 is attached to the opposite substrate.

Because the storage capacitances 360 are formed above the opaque region R40 of the substrate 300, the aperture ratio of the display equipped with the color filter array substrate 300 can be higher than that of the prior art. Wherein, the conductive films 350 could be electrically connected to the pixel electrodes (not shown) of an active device array substrate in an LCD. However, the conductive films 350 could be electrically connected to other voltage provider. Furthermore, the material of the conductive films 350 could be metal or others. The storage capacitances 360 with metallic conductive films 350 have great performance.

Otherwise, a black matrix 370 disposed over the opaque region R40 of the substrate 310 and under the common electrode layer 330 could be further provided in the color filter array substrate 300, wherein the conductive films 350 locate above the black matrix 370.

Figure 4:
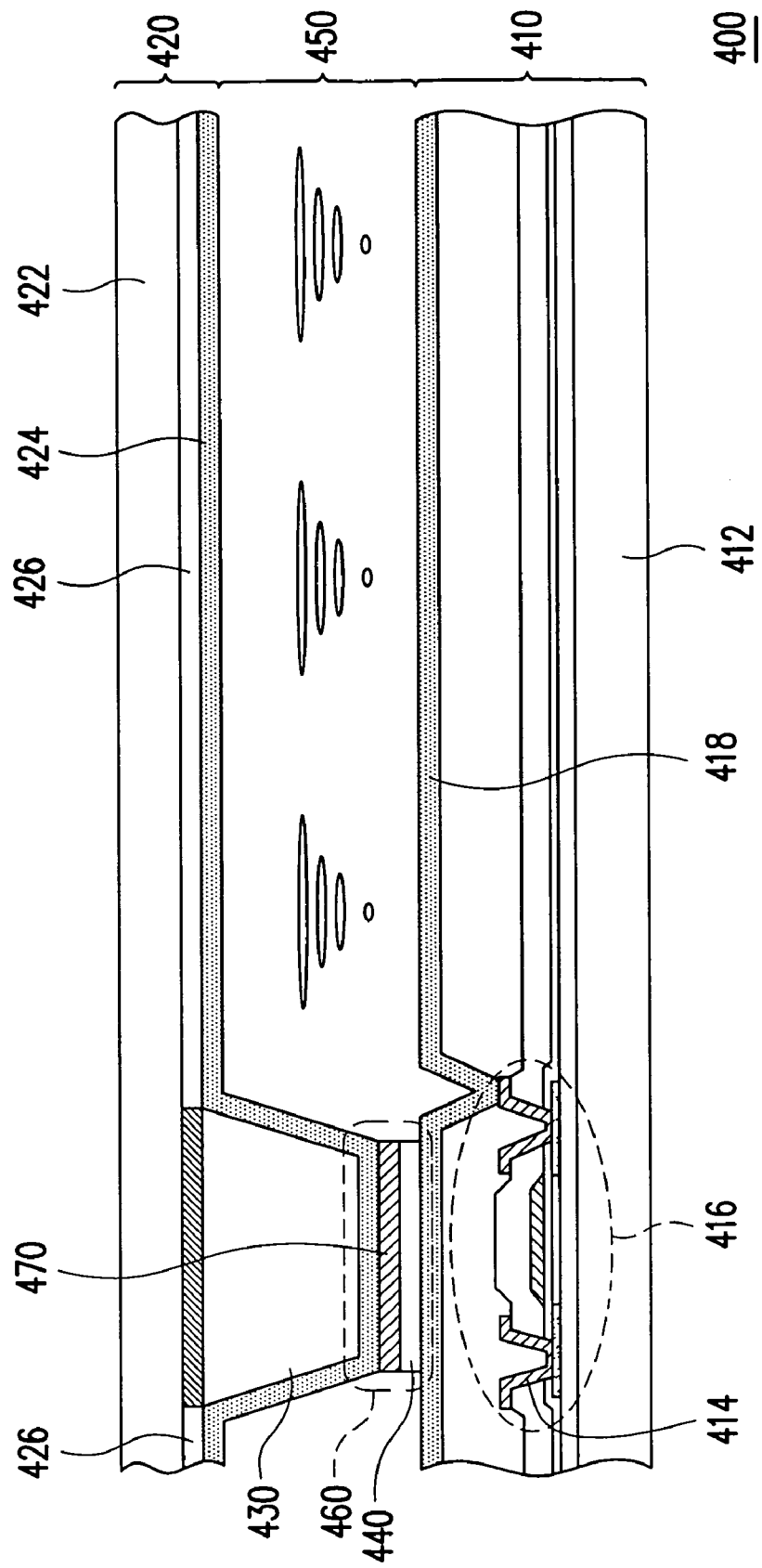
FIG. 4 is a cross-sectional view, schematically illustrating an embodiment of the LCD panel according to the present invention.

FIG. 4 is a cross-sectional view, schematically illustrating an embodiment of the LCD panel according to the present invention. As shown in FIG. 4, the liquid crystal display panel 400 includes an active device array substrate 410, an opposite substrate 420, a plurality of photo spacers 430, a dielectric layer 440 and a liquid crystal layer 450. The active device array substrate 410 includes a substrate 412, a plurality of scan lines (not shown), a plurality of data lines 414, a plurality of active devices 416 and a plurality of pixel electrodes 418. There are only one data line 414, one active device 416 and one pixel electrode 418 shown in FIG. 4. The substrate 412, the scan lines, the data lines 414, the active devices 416 and the pixel electrodes 418 are similar to the same components of the active device array substrate 200 shown in FIG. 2A, and the description of them is omitted here.

The opposite substrate 420 is disposed over the active device array substrate 410 and includes a substrate 422 and a common electrode layer 424 disposed over the substrate 422. The liquid crystal layer 450 is disposed between the active device array substrate 410 and the opposite substrate 420. The photo spacers 430 are disposed between the substrate 422 and the common electrode layer 424, and the photo spacers 430 are located in an opaque region being corresponding to the scan lines, the data lines 414 and the active devices 416. The photo spacers 430 are used to keep a gap between the active device array substrate 410 and the opposite substrate 420. The dielectric layer 440 is disposed between the pixel electrodes 418 and the common electrode layer 424 and located at least in the region being corresponding to the photo spacers 430, so that a plurality of storage capacitances 460 are formed with the pixel electrodes 418 and the common electrode layer 424 in the region being corresponding to the photo spacers 430. Because the storage capacitances 460 are formed above the opaque scan lines, the opaque data lines 414 or the opaque active devices 416, the aperture ratio will not be decreased, so that the liquid crystal display panel 400 has the aperture ratio higher than that of the prior art.

Otherwise, a plurality of conductive films 470 could be disposed between the common electrode layer 424 and the dielectric layer 440 and located in the region being corresponding to the photo spacers 430. Optionally, the conductive films 470 also could be disposed between the pixel electrodes 418 and the dielectric layer 440. Furthermore, the conductive films 470 could be both disposed between the pixel electrodes 418 and the dielectric layer 440 and disposed between the common electrode layer 424 and the dielectric layer 440. The material of the conductive films 470 could be metal. The conductive films 470 can enhance the adhesion between the pixel electrodes 418 and the dielectric layer 440 and the adhesion between the common electrode layer 424 and the dielectric layer 440. Moreover, the conductive films 470 also improve the performance of the storage capacitances 460.

Similar to the color filter array substrate 300 shown in FIG. 3A, the opposite substrate 420 may further comprises a plurality of color filters 426 and a black matrix 428 disposed between the substrate 422 and the common electrode layer 424. The color filters 426 and the black matrix 428 are similar to the color filters 320 and the black matrix 370 respectively, and the description of them is omitted here. However, the color filters 426 also could be formed on the active device array substrate 410, such as the color filters on array (COA) technology.

Figure 5:
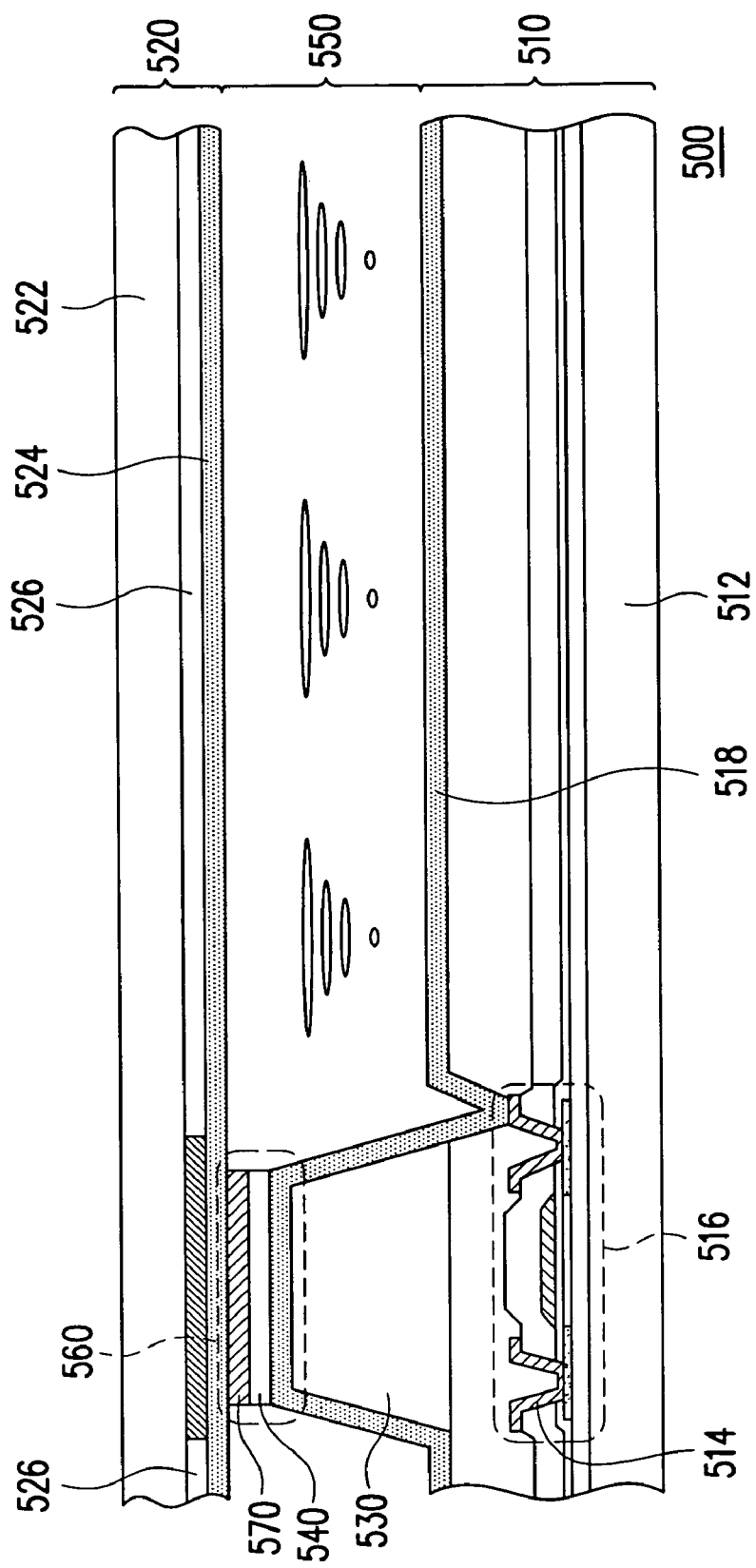
FIG. 5 is a cross-sectional view, schematically illustrating another embodiment of the LCD panel according to the present invention.

FIG. 5 is a cross-sectional view, schematically illustrating another embodiment of the LCD panel according to the present invention. As shown in FIG. 5, the LCD panel 500 is similar to the LCD panel 400 shown in FIG. 4, but the photo spacers 530 are disposed over the substrate 512 and under the pixel electrodes 518. Since the photo spacers 530 still be located in the opaque region being corresponding to the scan lines, the data lines 514 or the active devices 516, the liquid crystal display panel 500 also has the aperture ratio higher than that of the prior art. The photo spacers 530 are disposed over the opaque region of the substrate 512 and between the substrate 512 and the pixel electrodes 518.

Figure 6:
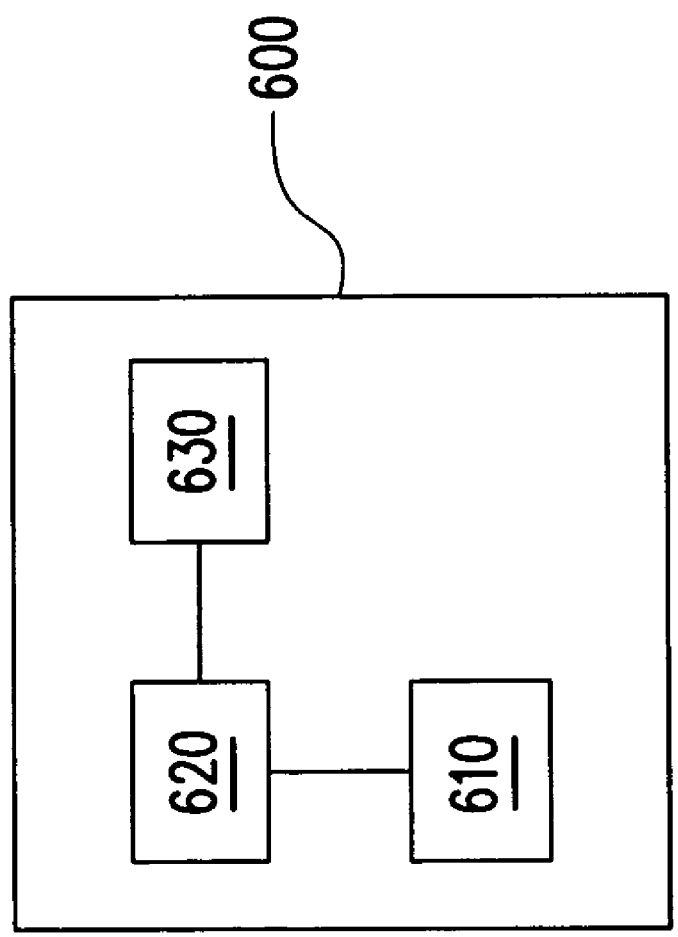
FIG. 6 is a block diagram, schematically illustrating an embodiment of the electronic apparatus according to the present invention.

FIG. 6 is a block diagram, schematically illustrating an embodiment of the electronic apparatus according to the present invention. In FIG. 6, the electronic apparatus 600, such as a mobile phone, an LCD television set, a computer system, a game player, or a device with a display region, and so on, includes a user interface 610, a circuit unit 620, and a LCD panel 630. Wherein, the LCD panel 630 could be one of the LCD panel 400 and 500 shown in FIGS. 4 and 5. The circuit unit 620 coupled with the user interface 610 and the LCD panel 630, so that the user can use the electronic apparatus 600, and the information is display on the LCD panel 630. In other words, the LCD panel 630 of the present invention can be implemented into any electronic apparatus to serving as the display unit.

According to foregoing descriptions, the storage capacitances in the present invention locate in opaque region covered by other components and do not decrease the aperture ratio. Consequently, the active device array substrate, the color filter array substrate for using in a display, the LCD panel and the LCD module with high aperture ratio of the invention have the aperture ratio higher than that of the prior art. Moreover, any electronic apparatus equipped with the LCD panel of the present invention will have great image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A matrix substrate, comprising:
    a substrate, having a transparent region and an opaque region;
    a plurality of photo spacers, disposed over the opaque region of the substrate;
    a plurality of capacitors, disposed over or below the photo spacers; and
    a plurality of active devices disposed over the opaque region of the substrate, between the substrate and the photo spacers.

2. The matrix substrate according to claim 1, further comprising:
    a plurality of scan lines, disposed over the opaque region of the substrate;
    a plurality of data lines, disposed over the opaque region of the substrate, wherein the plurality of active devices are driven by the scan lines and the data lines; and
    a plurality of pixel electrodes, disposed over the substrate and electrically connected to the active devices.

3. The matrix substrate according to claim 2, wherein the capacitors each comprises a dielectric layer between a conductive film and a section of the pixel electrode extending over or below the photo spacer.

4. The matrix substrate according to claim 3, wherein the material of the conductive films is metal.

5. The matrix substrate according to claim 2, wherein the opaque region comprises the scan lines, the data lines and the active regions.

6. The matrix substrate according to claim 1, further comprising:
    a plurality of color filters, disposed over the substrate; and
    a common electrode layer, disposed over the substrate and covering the color filters and extending to above or below the photo spacers.

7. The matrix substrate according to claim 6, wherein the capacitors each comprises a dielectric layer between a conductive film and a section of the common electrode extending over or below the photo spacer.

8. The matrix substrate according to claim 7, further comprising a black matrix, wherein the common electrode layer is disposed between the black matrix and the photo spacer.

9. The matrix substrate according to claim 8, wherein the opaque region comprises the black matrix.

10. The matrix substrate according to claim 7, wherein the material of the conductive films is metal.

11. A liquid crystal display panel, comprising:
    a first substrate, having a transparent region and an opaque region;
    a second substrate, disposed over the first substrate;
    a plurality of photo spacers, disposed between the first substrate and the second substrate and located on the opaque region;

a plurality of capacitors, disposed between the first substrate and the photo spacers or disposed between the second substrate and the photo spacers;

a plurality of active devices disposed over the opaque region of the first substrate, between the substrate and the optical spacers; and a liquid crystal layer, disposed between the first substrate and the second substrate.

12. The liquid crystal display panel according to claim 11, further comprising:

a plurality of scan lines, disposed over the opaque region of the first substrate;

a plurality of data lines, disposed over the opaque region of the first substrate, wherein the plurality of active devices are driven by the scan lines and the data lines; and;

a plurality of pixel electrodes, disposed over the first substrate and electrically connected to the active devices.

13. The liquid crystal display panel according to claim 12, wherein the capacitors each comprises a dielectric layer between a conductive film and a section of the pixel electrode extending over or below the photo spacer.

14. The liquid crystal display panel according to claim 13, wherein the material of the conductive films is metal.

15. The liquid crystal display panel according to claim 11, further comprising:

a plurality of color filters, disposed over the second substrate; and a common electrode layer, disposed over the second substrate and covering the color filters and extending to above or below the photo spacers.

16. The liquid crystal display panel according to claim 15, wherein the capacitors each comprises a dielectric layer between a conductive film and a section of the common electrode extending over or below the photo spacer.

17. The liquid crystal display panel according to claim 16, further comprising a black matrix disposed between the second substrate and the common electrode layer and located corresponding to the photo spacers.

18. The liquid crystal display panel according to claim 16, wherein the material of the conductive films is metal.

19. An electronic apparatus, comprising:

the liquid crystal display panel according to claim 11;

a user interface; and a circuit unit, coupled to the liquid crystal display module and the user interface.

20. The electronic apparatus according to claim 19, wherein the electronic apparatus comprises a mobile phone, an LCD television set, a computer system, a game player, or a device with a display area.

* * * * *